(12) United States Patent
Orlando et al.

(10) Patent No.: US 9,249,819 B2
(45) Date of Patent: Feb. 2, 2016

(54) RIVET SEALING WASHER

(75) Inventors: Ronald Orlando, Westborough, MA (US); John P. Sanroma, Billerica, MA (US)

(73) Assignee: ATS Cases, Inc.

( * ) Notice: Subject to any disclaimer, the term of this patent is extended or adjusted under 35 U.S.C. 154(b) by 207 days.

(21) Appl. No.: 13/344,289

(22) Filed: Jan. 5, 2012

(65) Prior Publication Data

US 2013/0177364 A1    Jul. 11, 2013

(51) Int. Cl.
| | | |
|---|---|---|
| F16B 33/00 | (2006.01) | |
| F16B 19/00 | (2006.01) | |
| F16B 43/00 | (2006.01) | |
| F16B 19/10 | (2006.01) | |

(52) U.S. Cl.
CPC ............. *F16B 19/008* (2013.01); *F16B 43/001* (2013.01); *F16B 19/1054* (2013.01)

(58) Field of Classification Search
CPC .... F16B 19/1054; F16B 37/067; F16B 37/14; F16B 41/005; F16B 43/001; F16B 33/004; F16B 35/06; F16B 19/008; F22B 7/16
USPC ................. 411/34, 373, 376, 542, 369, 371.1
See application file for complete search history.

(56) References Cited

U.S. PATENT DOCUMENTS

| | | | | |
|---|---|---|---|---|
| 1,288,955 A | * | 12/1918 | Mennie | 411/376 |
| 1,359,819 A | * | 11/1920 | Mennie | 411/381 |
| 1,366,723 A | * | 1/1921 | Dodds | 411/376 |
| 2,099,678 A | * | 11/1937 | Curtis | 138/98 |
| 2,241,686 A | * | 5/1941 | Ware | 301/108.3 |
| 2,795,144 A | * | 6/1957 | Morse | 74/17.8 |
| 3,122,051 A | * | 2/1964 | Greene | 411/373 |
| 3,470,787 A | * | 10/1969 | Mackie | 411/377 |
| 3,726,178 A | * | 4/1973 | Dimitry | 411/371.1 |
| 3,750,523 A | * | 8/1973 | Fujita | 411/484 |
| 3,930,432 A | * | 1/1976 | Puchy | 411/376 |
| 4,092,896 A | * | 6/1978 | Puchy | 411/542 |
| 4,235,147 A | * | 11/1980 | Weidner, Jr. | 411/396 |
| 4,557,654 A | * | 12/1985 | Masuda et al. | 411/431 |
| 4,601,624 A | * | 7/1986 | Hill | 411/373 |
| 4,647,264 A | * | 3/1987 | Parner et al. | 411/338 |
| 4,883,399 A | * | 11/1989 | MacLean | 411/431 |
| 4,907,929 A | * | 3/1990 | Johnston Jr. | 411/431 |
| 4,944,644 A | * | 7/1990 | Bell | 411/375 |
| 5,068,956 A | * | 12/1991 | Malewicz | 29/437 |
| 5,129,770 A | * | 7/1992 | Coleman | 411/373 |
| 5,557,897 A | * | 9/1996 | Kranz et al. | 52/410 |

(Continued)

OTHER PUBLICATIONS

Timings, Roger L.. (2006). Newnes Mechanical Engineers Pocket Book (3rd Edition)—4.2.8 POP® Rivets. Elsevier. Online version available at:http://app.knovel.com/hotlink/pdf/id:kt00C76PBB/newnes-mechanical-engineers/pop-rivets.*

*Primary Examiner* — Gary Estremsky
(74) *Attorney, Agent, or Firm* — Parker Ibrahim & Berg LLC; Stephen D. LeBarron

(57) ABSTRACT

A rivet sealing washer that includes a washer body with an outer surface and an inner surface and a rivet aperture. Additionally, the rivet washer includes a membrane with at least one raised high pressure point skirt or rib and at least one recessed trough that provides a continuous seal over the outer surface of the washer body, the rivet body, and the mandrel head, and is sealably and continuously connected to the perimeter of the washer body and optionally a circumferential portion of the outer surface.

17 Claims, 5 Drawing Sheets

(56) References Cited

U.S. PATENT DOCUMENTS

| | | | | |
|---|---|---|---|---|
| 5,653,564 A | * | 8/1997 | Nakamura | 411/373 |
| 5,755,908 A | * | 5/1998 | Rayburn et al. | 156/224 |
| 5,906,463 A | * | 5/1999 | Damm et al. | 411/369 |
| 6,142,579 A | * | 11/2000 | Thiel | 301/37.374 |
| 6,186,719 B1 | * | 2/2001 | Chou | 411/429 |
| 7,182,561 B2 | * | 2/2007 | Jones | 411/43 |
| 7,581,913 B2 | * | 9/2009 | Ordonio et al. | 411/542 |
| 2002/0119025 A1 | * | 8/2002 | Wirth et al. | 411/43 |
| 2010/0300035 A1 | * | 12/2010 | Pither | 52/745.21 |

* cited by examiner

RIVET SEALING WASHER

BACKGROUND OF THE INVENTION

1. Field of the Invention

The present invention relates to washers, and more particularly to rivet sealing washers.

2. Description of the Related Art

Rivets are a type of permanent mechanical fastener used for connecting parts through which holes are formed. There are a number of different types of rivets, including: solid rivets, semi-tubular rivets, blind rivets, drive rivets, flush rivets, friction-lock rivets, and self-pierce rivets. Solid and semi-tubular rivets have a head and a shaft, and the end of the shaft farthest from the head is referred to as the buck-tail. Blind rivets are composed of two parts: the rivet body and the setting mandrel. Like solid and semi-tubular rivets, the rivet body of a blind rivet has a head and a shaft; however, the rivet body is tubular and has a setting mandrel that passes through the center of the rivet body, such that the setting mandrel head is located at the end of the rivet shaft farthest from the rivet head, and the tip of the setting mandrel protrudes through the rivet head end of the rivet body.

To join two materials together, blind rivets are inserted through aligned holes in the two substrates, and the rivet head is held in place against the first of the two substrates while an opposing force is applied to the mandrel. The opposing force causes the mandrel head to deform the end of the rivet shaft, thereby forming a complete rivet. A line of the weakness is provided in the mandrel stem adjacent to the mandrel head allowing it to break off at a predetermined setting force once the rivet has been formed.

Blind rivets display adequate performance when joining metal work-pieces under standard conditions. However, blind rivets are disadvantageous for implementations that require, for example, an airtight or watertight seal on the backside of the materials to be joined because air or water can seep around the remnant of the mandrel head, and thereby pass through the rivet body. Additionally, the mandrel head can also fall out of the rivet body, thereby creating an unobstructed passage for air or water to flow through the rivet body.

Blind rivets are also disadvantageous for many electromechanical applications because vibrations in the equipment can cause the mandrel head to loosen and rattle within the rivet body. Additionally, the mandrel head can also fall out of the rivet body, as discussed above, thereby causing problems with, or damage to, the electrical and/or mechanical equipment containing the blind rivet.

Some previous techniques have tried to address these significant disadvantages by using a flowable sealant, such as an epoxy resin, that may be disposed between the rivet body and the mandrel head, such that setting of the blind rivet compresses the sealant between the head of the mandrel and an inner surface of the rivet body to form a seal between the two surfaces. Disadvantageously, such a proposal requires that the epoxy resin be evenly distributed when the rivet is set, however, normal variation in the deformation of the rivet shaft by the mandrel head occurs from rivet to rivet, and can result in incomplete seal formation because the epoxy resin is not evenly distributed. Another disadvantage of this technique is that epoxy resins require special conditions in order to cure properly, which increases the complexity of the rivet setting process. For example, some epoxy resins require high temperature and/or a separate chemical such as an activator in order to cure. In view of the foregoing, it is clear that the most significant disadvantage of this proposal is that it requires specially designed rivets, which are difficult to manufacture. An end-user interested in using such rivets would need to place a custom order with a rivet supplier who would, in turn, need to re-tool a production line in order to produce the rivets. As a consequence, rivets of the proposed technique would be prohibitively expensive.

Therefore, there is a need in the art for a way to modify an existing rivet so as to provide an airtight and/or watertight seal when sealing a variety of different materials.

SUMMARY OF THE INVENTION

The present invention relates to washers, and more particularly to rivet sealing washers for use in creating set rivets that are airtight and/or watertight.

In one aspect, the invention provides a rivet washer that includes a washer body with an outer surface and an inner surface, a rivet aperture, and a membrane with at least one raised high pressure point skirt and at least one recessed trough that covers an outer surface of the washer body and is sealably and continuously connected to the perimeter of the washer body and optionally a circumferential portion of the outer surface. In one embodiment, the membrane is sealably connected to the perimeter of the washer body, and optionally a circumferential portion of the outer surface, by a fixing means, which may include, but is not limited to, a bonding method, a mechanical method, and the like. Methods of bonding elastomers to metals are well known in the art, and the skilled artisan will appreciate that the choice of bonding agent will depend upon the particular elastomer to be bonded, and the bonding method to be used. For example, such bonding agents may include, but are not limited to, cements, adhesives, and vulcanizing agents. Methods of mechanically fixing elastomers to metals are also known in the art, and may include, but are not limited to, friction methods, pressure methods, seating methods, interlocking seating methods, interlocking methods, and the like. For example, in another embodiment, the membrane is sealably connected to the perimeter of the washer body by a protrusion extending radially and circumferentially from the outer surface perimeter of the washer body, and the membrane may be sealably connected by friction pressure, a bonding agent, or any combination thereof. In another embodiment, the membrane may be made of silicone, silicone rubber, natural rubber, and synthetic rubber. In a preferred embodiment, the membrane is made of silicone rubber.

In another aspect, the invention provides a rivet assembly that includes a washer body with an outer surface and an inner surface, a rivet aperture, and a membrane with at least one raised high pressure point skirt and at least one recessed trough that covers the outer surface of the washer body and is sealably and continuously connected to the perimeter of the washer body and optionally a circumferential portion of the outer surface, as well as a rivet configured to be installed with the washer body.

In another aspect, the invention provides a rivet washer that includes a washer body with an outer surface and an inner surface, a rivet aperture, and a silicone rubber membrane with at least one raised high pressure point skirt and at least one recessed trough that is continuously sealably connected to the perimeter of the washer body by a bonding agent by a fixing means, and covers the upper surface of the washer body.

It is to be understood that both the foregoing general description and the following detailed description are exemplary and explanatory only and are intended to provide further explanation of the present invention, as claimed.

BRIEF DESCRIPTION OF THE DRAWINGS

The objects, features, and advantages of the present invention will be more apparent from the following detailed description in conjunction with the accompanying drawings, in which.

DETAILED DESCRIPTION OF THE INVENTION

The present invention relates to a washer, and more particularly a rivet sealing washer. Advantageously, the present invention allows an airtight or watertight seal to be formed around one end of a standard rivet such as, for example, a blind rivet, thereby providing a cost effective solution to the longstanding problem presented by rivets that are not airtight or watertight.

Figure 1:
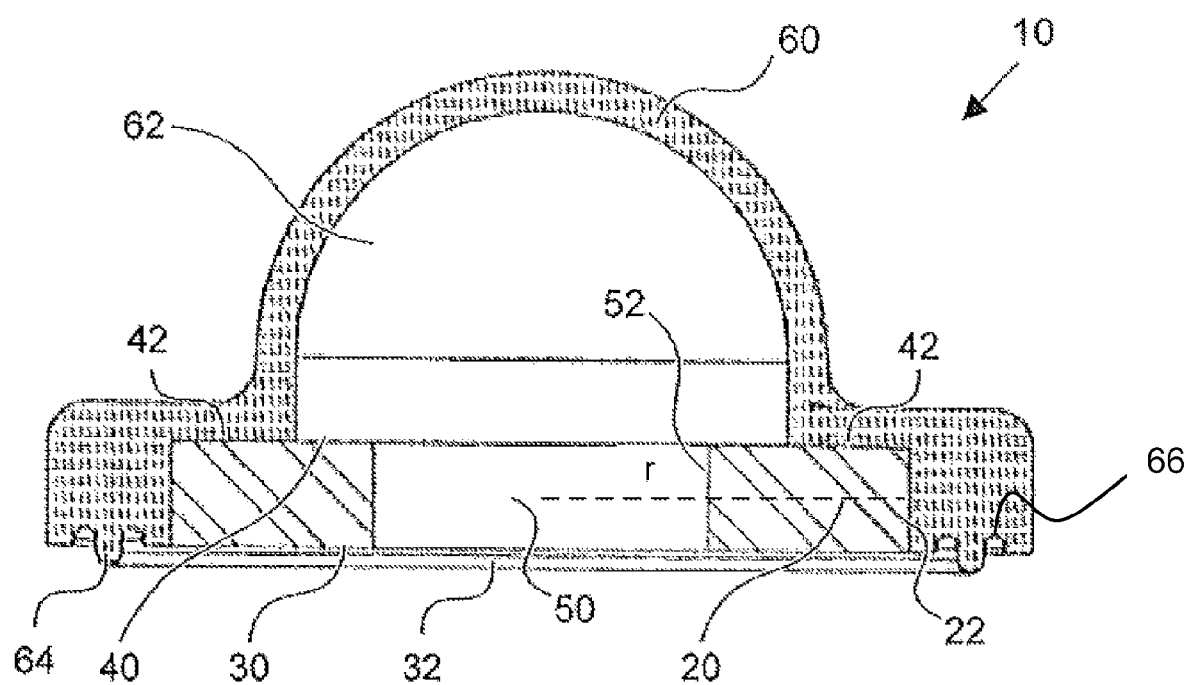
FIG. 1 and FIG. 2 each are a cross-sectional view of different embodiments of a rivet sealing washer of the present invention.

Referring to FIG. 1, a rivet sealing washer 10 of the present invention includes a washer body 20, an aperture 50, and a membrane 60. In the exemplary embodiment shown, washer body 20 is generally cylindrical in shape and has a substantially planar inner surface 30 and a substantially planar outer surface 40 that are positioned substantially parallel to one another and spaced apart by a predetermined distance (i.e. the thickness of the washer body 20). Inner surface 30 abuts one of the substrates 32 (i.e. the material in which the rivet is being placed) to be joined, and outer surface 40 abuts membrane 60, the end of the rivet shaft proximate to the setting mandrel head (not shown), and optionally membrane lumen 62. Washer body 20 also has an edge 22 that is substantially perpendicular to inner surface 30 and outer surface 40 and spans around the perimeter or circumference of washer body 20. Washer body 20 may be made of any suitable material such as, for example, metal, plastic, rubber, etc. In some embodiments, washer body 20 is made of the same material as the rivet in order to minimize corrosion.

Aperture 50 passes through washer body 20 perpendicular to inner surface 30 and outer surface 40, such that aperture edge 52 is generally parallel to edge 22. Aperture 50 is generally cylindrical in shape and centrally located within washer body 20 such that the center of aperture 50 corresponds to the end of radius line r farthest from circumferential edge 22. The diameter of aperture 50 may be varied or customized to accommodate the size of rivet being used in a particular riveting application. The membrane 60 and washer body 20 may be scaled to accommodate different rivet sizes.

In the illustrative embodiment of the present invention, membrane 60 is a unibody membrane that encapsulates outer surface 40 of the washer body 20 and functions, in part, to provide a continuous seal through its unibody design; because the design is a singular body, there are no joints/seams where water or air can leak through. In the embodiment of the invention shown in FIG. 1, membrane 60 is sealably connected to the entirety of edge 22 of washer body 20, as well as to an outer circumferential portion 42 of outer surface 40, by a bonding agent. In the embodiment shown, the outer circumferential portion 42 of washer body 20 bonded to membrane 60 includes about 50% of the portion of outer surface 40 closest to edge 22 (i.e. the portion extending from edge 22 to about midway between edge 22 and bore edge 52). It is contemplated within the scope of the invention that the outer circumferential portion 42 of washer body 20 bonded to membrane 60 may include anywhere from about 0% to about 100% of outer surface 40 as measured from edge 22. For example, the outer circumferential portion 42 of washer body 20 bonded to membrane 60 may include about 10%, 20%, 30%, 40%, 50%, 60%, 70%, 80%, 90%, or 100% of outer surface 40 as measured from edge 22. It is to be understood that the percentages contemplated are not to be limited to the exact percentages specified, but also include all intermediate values such as, e.g., about 20%, 21%, 22%, 23%, 24%, 25%, 26%, 27%, 28%, 29%, or 30%.

In the embodiment shown in FIG. 1, membrane 60 encapsulates washer body 20 so as to create membrane lumen 62, which provides a space or cavity between a portion of outer surface 40 and membrane 60. Membrane lumen 62 provides additional room to accommodate the rivet and functions, in part, to minimize the stress placed upon membrane 60 as the rivet is passed through aperture 50 prior to the rivet being set. In other embodiments, membrane 60 may lie flush against outer surface 40, such that membrane lumen 62 is no longer present. The unibody configuration of membrane 60 shown in FIG. 1 is an exemplary embodiment, and it is to be understood that this configuration may be varied depending upon the shape and size of rivet sealing washer 10, as well as the nature of a particular riveting application.

The ability of membrane 60 to provide an airtight or watertight seal is facilitated by the portion of membrane 60 that contacts substrate 32. Preferably, the portion of membrane 60 that contacts substrate 32 may include at least one raised high pressure point skirt or rib 64, which provides a positive high pressure sealing feature capable of providing a robust airtight or watertight seal through compression upon a pressure application (e.g., setting a rivet). As shown in FIG. 1, the portion of membrane 60 that contacts substrate 32 may also have at least one recessed trough 66 adjacent to the at least one raised high pressure point skirt or rib 64, which allows for the rib to deform into a void permitting the washer to make contact with the substrate, thereby ensuring a robust connection and seal.

As shown in FIG. 1, recessed trough 66 provides a space to accommodate the at least one raised high pressure point skirt or rib 64 as it is compressed upon a pressure application, thereby providing an airtight or watertight seal. In the illustrative embodiment shown in FIG. 1, the portion of membrane 60 that contacts substrate 32 includes one raised high pressure point skirt or rib 64, and two adjacent recessed troughs 66. It is to be understood that the location of the raised high pressure point skirt or rib 64 is not limited to the central location depicted in FIG. 1, but may also be located either closer to, or farther from, edge 22 (see, e.g., FIG. 2).

In other embodiments, the portion of membrane 60 that contacts substrate 32 may include multiple raised ribs and/or multiple recessed troughs. It is also contemplated that the portion of membrane 60 that contacts substrate 32 may include no raised ribs. For example, the portion of membrane 60 that contacts substrate 32 may be substantially parallel to inner surface 30 of washer body 20, but raised relative thereto (i.e. the portion of membrane 60 that contacts substrate 32 extends beyond inner surface 30, in the direction opposite of outer surface 40, for a predetermined distance). Advantageously, the present invention provides an airtight or watertight seal to a standard rivet that may maintain complete contact of inner surface 30 of washer body 20 with substrate 32, thereby minimizing the likelihood that the rivet will corrode and/or loosen over time. Furthermore, is not necessary that contact of inner surface 30 of washer body 20 with substrate 32 be continuous in all embodiments to generate the required level of airtightness or watertight seal which is desired. Thus, in some embodiments, the contact may be sectional or intermittent depending upon the degree of sealability.

Figure 2:
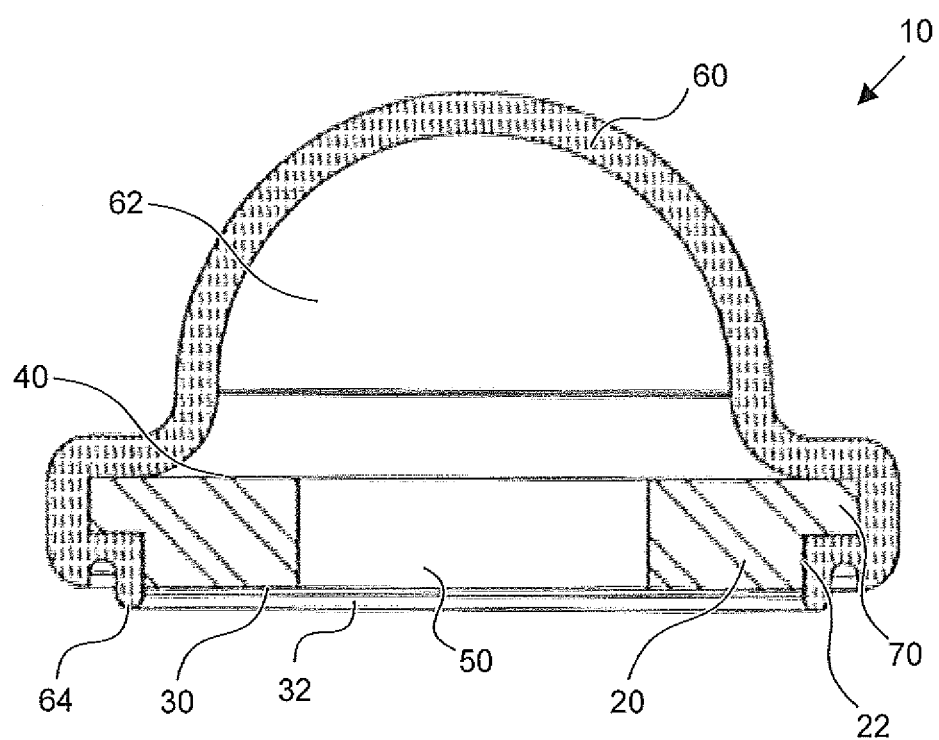

FIG. 2 shows an embodiment in which washer body 20 includes a circumferential protrusion 70 extending outward from the portion of edge 22 proximate to outer surface 40. In one embodiment, circumferential protrusion 70 allows membrane 60 to be attached to washer body 20 via fiction and pressure. In another embodiment, membrane 60 may be attached to washer body 20 via friction in combination with a bonding agent.

Membrane 60 may be made of any flexible membrane material suitable for a particular riveting application (e.g. watertight or airtight). For example, membrane 60 may comprise silicon, silicon rubber, natural rubber, synthetic rubber, elastic polymers, and the like. In a preferred embodiment, membrane 60 may comprise a soft durometer silicon such as, for example, Shore A or below. In another preferred embodiment, membrane 60 may comprise a soft durometer silicon rubber such as, for example, Shore A or below. It is also contemplated that the color of membrane 60 may be varied to provide a more decorative appearance to the backside of the rivet, or to color coordinate the set rivet to match the joining materials. It is also contemplated that membrane 60 may be made from a clear material to allow visual inspection of the set rivet.

Membrane 60 may be sealably connected to washer body 20 using any of a variety of methods. One exemplary method is a bonding agents, selected from any one of those known to one of skill in the art which are capable of adhering the membrane to the washer body. The type of bonding agent used will depend on the type of material or materials used for membrane 60 and washer body 20. Alternatively, as discussed above the fixing means may also be mechanical in nature with no bonding agent at all.

Figure 3:
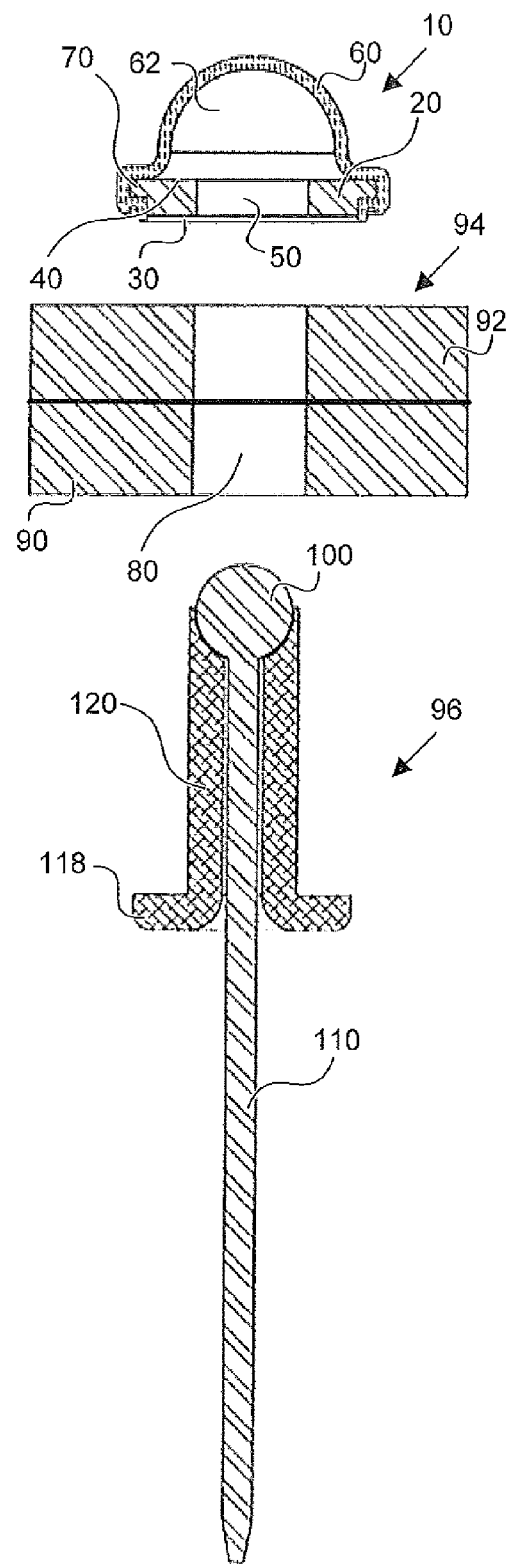
FIG. 3 is a cross-sectional view of an exemplary rivet sealing washer and rivet of the present invention prior to setting of the rivet.

FIG. 3 shows an exemplary embodiment of a rivet sealing washer 10 and rivet 94 of the present invention prior to placement of the rivet 94 in substrate 92 and subsequent setting of the rivet 96. The mandrel head 100 and rivet body 120 of rivet 96 is inserted through bore 80 in adjoining work-piece substrates 90 and 92 and aperture 50 in washer body 20, until rivet head 118 is seated against work-piece substrate 90 and mandrel shaft 110 protrudes from work-piece substrates 90 and 92 on the same side as rivet head 118. In one embodiment, mandrel head 100 will push membrane 60 upward, away from aperture 50, when rivet head 118 is seated against work-piece substrate 90.

Figure 4:
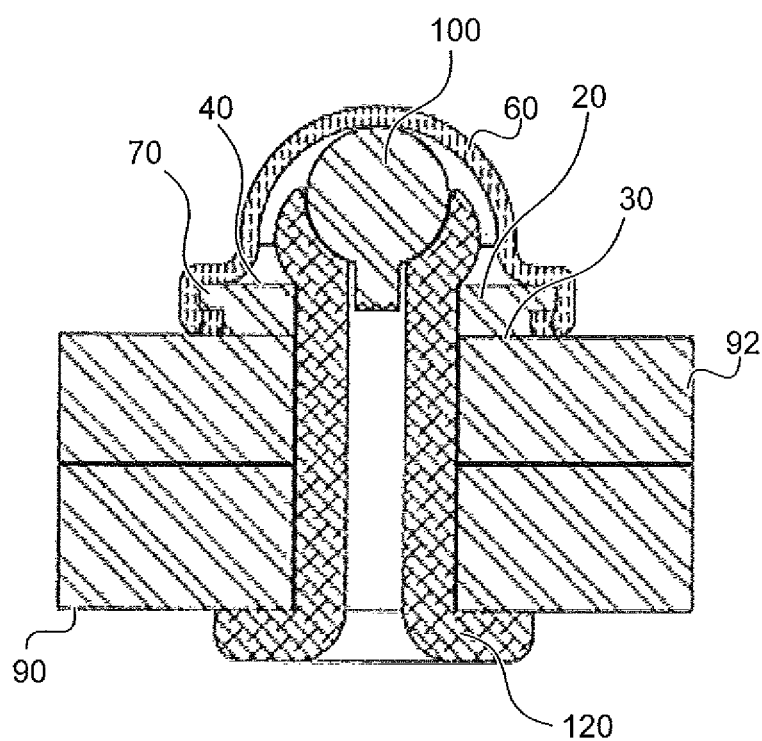
FIG. 4 is a cross-sectional view of an exemplary rivet sealing washer and rivet of the present invention after setting of the rivet.

FIG. 4 shows an exemplary embodiment of a rivet sealing washer 10 and rivet body 120 of the present invention after setting of the rivet to join work-piece substrates 90 and 92. Once the rivet has been set, membrane 60 returns to an undeformed, or less deformed, position against mandrel head 100, thereby providing an airtight or watertight seal against the mandrel head 100 side of rivet body 120. Advantageously, membrane 60 also prevents the mandrel head 100 from falling out of rivet body 120, and water leaking between the mandrel head 100 and rivet body 120.

Figure 5:
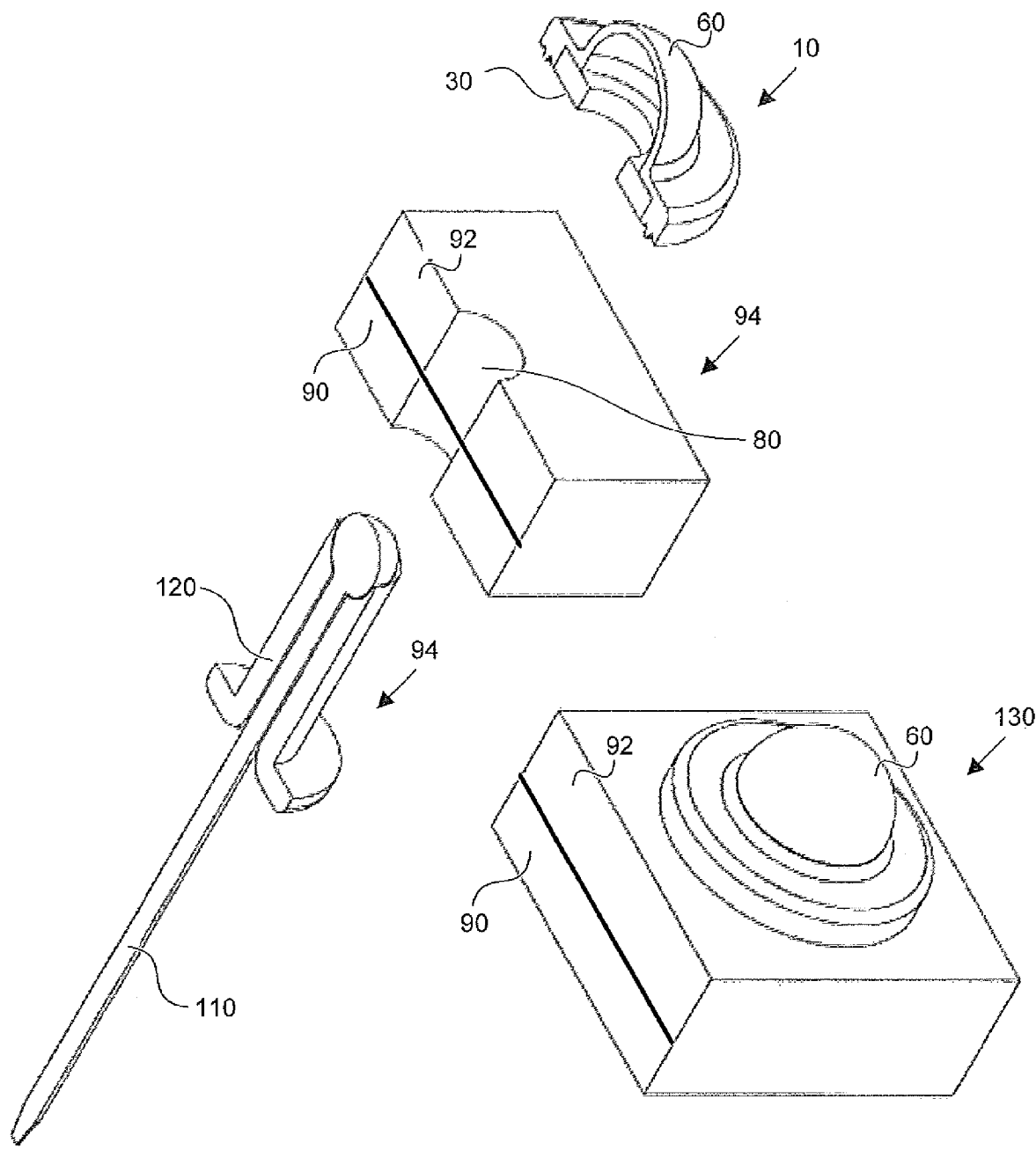
FIG. 5 is a cross-sectional perspective view of an exemplary rivet sealing washer and rivet of the present invention prior to setting of the rivet.

FIG. 5A shows a cross-sectional perspective view of an exemplary embodiment of a rivet sealing washer 10 and rivet 96 of the present invention prior to placement of the rivet 94 in substrate 92 and subsequent setting of the rivet 96. FIG. 5B shows a top-side perspective view 130 of the rivet sealing washer 10 after setting of rivet 96.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A blind rivet washer, comprising:
   a washer body with an outer surface, an inner surface, and a rivet aperture; and
   a watertight or airtight membrane comprising at least one raised pressure point skirt and at least one recessed troughs on each side of the at least one raised pressure point skirt, wherein the membrane covers the outer surface of the washer body and is sealably watertight or airtight and continuously connected to the perimeter of the washer body, and optionally to a circumferential portion of the outer surface,
   wherein the watertight or airtight membrane encapsulates the washer body and the rivet aperture to create a lumen which provides a space between a portion of the outer surface of the washer body and the watertight or airtight membrane,
   wherein the raised pressure point skirt and the at least one recessed trough on each side of the at least one raised pressure point skirt are oriented to face a substrate on which the blind rivet washer is sealed against.

2. The blind rivet washer of claim 1, wherein the watertight or airtight membrane is sealably watertight or airtight connected to the perimeter of the washer body, and optionally a circumferential portion of the outer surface, by a fixing means.

3. The blind rivet washer of claim 2, wherein the fixing means is a bonding agent.

4. The blind rivet washer of claim 1, wherein the watertight or airtight membrane is sealably watertight or airtight connected to the perimeter of the washer body by a protrusion extending radially and circumferentially from the outer surface perimeter of the washer body.

5. The blind rivet washer of claim 4, wherein the watertight or airtight membrane is sealably watertight or airtight connected by friction pressure, a bonding agent, or any combination thereof.

6. The blind rivet washer of claim 1, wherein the watertight or airtight membrane is a material selected from the group consisting of silicone, silicone rubber, natural rubber, and synthetic rubber.

7. The blind rivet washer of claim 1, wherein the watertight or airtight membrane is silicone rubber.

8. A blind rivet assembly, comprising:
   a blind rivet washer body with an outer surface, an inner surface, and a rivet aperture;
   a watertight or airtight membrane comprising at least one raised pressure point skirt and at least one recessed troughs on each side of the at least one raised pressure point skirt, wherein the membrane covers the outer surface of the washer body and is sealably watertight or airtight and continuously connected to the perimeter of the washer body, and optionally to a circumferential portion of the outer surface; and a rivet configured to be installed with the washer body, wherein the watertight or airtight membrane encapsulates the washer body, a head of the blind rivet and the rivet aperture to create a lumen which provides a space between a portion of the outer surface of the washer body and the watertight or airtight membrane, wherein the raised pressure point skirt and the at least one recessed trough on each side of the at least one raised pressure point skirt are oriented to face a substrate on which the blind rivet washer is sealed against.

9. The blind rivet assembly of claim 8, wherein the watertight or airtight membrane is sealably watertight or airtight connected to the perimeter, and optionally a circumferential portion of the outer surface, of the washer body by a fixing means.

10. The blind rivet assembly of claim 9, wherein the fixing means is a bonding agent.

11. The blind rivet assembly of claim 8, wherein the watertight or airtight membrane is sealably watertight or airtight connected to the perimeter of the washer body by a protrusion extending radially and circumferentially from the outer surface perimeter of the washer body.

12. The blind rivet assembly of claim 11, wherein the watertight or airtight membrane is sealably watertight or airtight connected by friction, a bonding agent, mechanical methods or any combination thereof.

13. The blind rivet assembly of claim 8, wherein the watertight or airtight membrane is a material selected from the group consisting of silicone, silicone rubber, natural rubber, and synthetic rubber.

14. The blind rivet assembly of claim 8, wherein the watertight or airtight membrane is silicone rubber.

15. A blind rivet washer, comprising:

a washer body with an outer surface, an inner surface, and a rivet aperture; and a watertight or airtight silicone rubber membrane comprising at least one raised pressure point skirt and at least one recessed trough on each side of the at least one raised pressure point skirt, wherein the silicone rubber membrane covers the outer surface of the washer body and is sealably watertight or airtight and continuously connected to the perimeter of the washer body, and optionally to a circumferential portion of the outer surface, by a fixing means, wherein the silicone rubber membrane encapsulates washer body and rivet aperture to create a lumen which provides a space between a portion of the outer surface of the washer body and the silicone rubber membrane, wherein the raised pressure point skirt and the at least one recessed trough are oriented to face a substrate on which the blind rivet washer is sealed against.

16. The blind rivet washer of claim 15, wherein the fixing means is a bonding agent.

17. The blind rivet washer of claim 15, wherein the fixing means is mechanical.

* * * * *